United States Patent
Ma et al.

(10) Patent No.: US 11,357,062 B2
(45) Date of Patent: Jun. 7, 2022

(54) COMMUNICATION METHOD AND APPARATUS

(71) Applicant: HUAWEI TECHNOLOGIES CO., LTD., Shenzhen (CN)

(72) Inventors: Jingwang Ma, Shanghai (CN); Runze Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/992,203

(22) Filed: Aug. 13, 2020

(65) Prior Publication Data

US 2020/0383150 A1 Dec. 3, 2020

Related U.S. Application Data

(63) Continuation of application No. PCT/CN2019/074811, filed on Feb. 12, 2019.

(30) Foreign Application Priority Data

Feb. 14, 2018 (CN) .......................... 201810152374.3

(51) Int. Cl.
*H04W 76/11* (2018.01)
*H04W 8/24* (2009.01)
(Continued)

(52) U.S. Cl.
CPC .............. *H04W 76/11* (2018.02); *H04W 8/24* (2013.01); *H04W 12/069* (2021.01); *H04W 12/08* (2013.01)

(58) Field of Classification Search
CPC ... H04W 8/24; H04W 12/0609; H04W 12/08; H04W 76/11
(Continued)

(56) References Cited

U.S. PATENT DOCUMENTS

2017/0070892 A1 3/2017 Song et al.
2018/0288582 A1* 10/2018 Buckley ................ H04W 48/14
(Continued)

FOREIGN PATENT DOCUMENTS

CN 106549806 A 3/2017
CN 106572516 A 4/2017
(Continued)

OTHER PUBLICATIONS

3GPP. "3rd Generation Partnership Project; Technical Specification Group Services and System Aspects; Study on the security aspects of the next generation system (Release 14)." 3GPP TR 33.899 V1.3.0, Sep. 27, 2017, 605 pages.
(Continued)

*Primary Examiner* — Congvan Tran
(74) *Attorney, Agent, or Firm* — Maier & Maier , PLLC

(57) ABSTRACT

An exemplary embodiment provides a communication method and an apparatus. The method includes: receiving, by a UCF, a first message from a terminal device, where the first message includes first information and an identifier of the terminal device; learning, by the UCF, of a first service type based on the first message; learning, by the UCF based on the service type and the identifier of the terminal device, of a first NF that serves the terminal device; and sending, by the UCF, the first information to the first NF, where the first information is information that the terminal device sends to the first NF.

18 Claims, 13 Drawing Sheets

(51) Int. Cl.
*H04W 12/08* (2021.01)
*H04W 12/069* (2021.01)

(58) Field of Classification Search
USPC .................................................. 370/328–329
See application file for complete search history.

(56) References Cited

U.S. PATENT DOCUMENTS

2021/0076250 A1\* 3/2021 Wang ................ H04W 28/0268
2021/0153111 A1\* 5/2021 Theimer ............... H04W 88/06

FOREIGN PATENT DOCUMENTS

| CN | 107295609 A | 10/2017 |
| CN | 107343306 A | 11/2017 |
| CN | 107580360 A | 1/2018 |
| WO | 2017/075757 A1 | 5/2017 |
| WO | 2018006306 A1 | 1/2018 |

OTHER PUBLICATIONS

3GPP. "3rd Generation Partnership Project; Technical Specification Group Services and System Aspects; Study on Enhancement to the 5GC Location Services (Release 16)." 3GPP TR 23.731 V0.1.1, Feb. 6, 2018, 11 pages.

\* cited by examiner

COMMUNICATION METHOD AND APPARATUS

CROSS-REFERENCE TO RELATED APPLICATIONS

This application is a continuation of International Application No. PCT/CN2019/074811, filed on Feb. 12, 2019, which claims priority to Chinese Patent Application No. 201810152374.3, filed on Feb. 14, 2018. The disclosures of the aforementioned applications are hereby incorporated by reference in their entireties.

TECHNICAL FIELD

An exemplary embodiment relates to the field of mobile communications technologies, and, for example, to a communication method and an apparatus.

BACKGROUND

When a network provides a network service for a terminal device, in addition to transmitting a message to an access and mobility management function (AMF) using a control plane message interface N1, the terminal device also needs to transmit a message to a network function on the network side through a user plane connection. For example, the terminal device sends, to a location management function (LMF) in the network through the user plane connection, location measurement assistance data provided by the terminal device. In this way, load of a control plane connection can be reduced because a message is transmitted through the user plane connection, and the data transmission capability of the user plane connection can be fully used. In addition to transmitting a message to the LMF through the user plane connection, the terminal device may also transmit, due to a requirement of a supported service, a message to another network function on the network side through the user plane connection, for example, a near field communication management function (proximity service communication function, PSCF) on the network side or a broadcast management function (BMF) on the network side.

In existing 4G networks, when a connection is established between the terminal device and the network function on the network side through a user plane, an independent data connection and corresponding application interface protocol are used. In technical implementations and standards, the following application interface functions need to be implemented: functions such as terminal device discovery and selection of a correct network, configuration of information about security between the terminal device and the network function, connection establishment and access authentication between the terminal device and the network function, and the like.

When the terminal device and a plurality of network functions on the network side establish connections through the user plane connection, a plurality of corresponding application interfaces need to be defined, and the terminal device and a network function on the network side each need to implement a corresponding application interface function. In addition, these application interfaces use different communications protocols, security mechanisms, and the like. Therefore, technical complexity on a terminal device side is increased in 4G; in addition to implementing related service functions, the network function on the network side further needs to process a connection to the terminal device, security, authorization, and the like. This also increases complexity of the network function on the network side. In addition, because the complexity of the terminal device and the complexity of the network function are increased, the terminal device and the network cannot efficiently support a new service function.

SUMMARY

An exemplary embodiment provides a communication method and an apparatus, to simplify communication between a terminal device and a network function on a network side.

According to a first aspect, an exemplary embodiment provides a communication method, including: receiving, by a user plane connection network element (UCF), a first message from a terminal device, where the first message includes first information and an identifier of the terminal device, and the first information is information that needs to be sent by the terminal device to a network function (NF); learning, by the UCF, of a first service type based on the first message; learning, by the UCF based on the first service type and the identifier of the terminal device, of a first NF that serves the terminal device; and sending, by the UCF, the first information to the first NF.

According to the foregoing embodiment, the UCF may send the first information from the terminal device to the corresponding NF 1.

In a possible implementation, the determining, by the UCF, a service type based on the first message includes: determining, by the UCF, the first service type based on first service type information, where the first message carries the first service type information; or learning, by the UCF, of the first service type based on a first port number corresponding to a port over which the first message is received and a correspondence between a port number and a service type.

In a possible implementation, the learning, by the UCF based on the first service type and the identifier of the terminal device, of a first NF that serves the terminal device includes: querying, by the UCF, local information based on the first service type and the identifier of the terminal device, to determine the first NF, where the local information includes a correspondence between a service type and a network function; or querying, by the UCF, the first NF from a unified data management (UDM) network element based on the first service type and the identifier of the terminal device.

In a possible implementation, an exemplary embodiment further includes: receiving, by the UCF, a third message sent by the terminal device, where the third message is used to request to establish a connection, and the third message includes the identifier of the terminal device; and establishing, by the UCF, a connection to the terminal device, and saving a context of the terminal.

In a possible implementation, an exemplary embodiment further includes: sending, by the UCF, a fourth message to the UDM, where the fourth message includes the identifier of the terminal device, information about the UCF, and an NF type of the UCF.

In a possible implementation, the third message further includes the first service type, and an exemplary embodiment further includes: allocating, by the UCF, the corresponding first port number to the first service type, storing a correspondence between the first service type and the first port number, and notifying the terminal device of the correspondence.

In a possible implementation, the third message further includes first security information, and an exemplary embodiment further includes: obtaining, by the UCF, a security key from an authentication server function (AUSF) network element based on the identifier of the terminal device; performing verification based on the security key and the first security information; and when the verification succeeds, performing the step of establishing a connection to the terminal device.

In the possible implementation, the UCF may verify the terminal device to establish a security connection.

In a possible implementation, before the establishing a connection to the terminal device, an exemplary embodiment further includes: generating, by the UCF, second security information based on the security key, and sending the second security information to the terminal device; and receiving a notification message returned by the terminal device after terminal device successfully verifies the UCF based on the second security information.

In the possible implementation, the terminal device may also verify the UCF.

According to a second aspect, an exemplary embodiment provides a communication method, including: receiving, by a UCF, a second message from a second network function, where the second message includes an identifier of a terminal device and second information sent by the second network function to the terminal device; learning, by the UCF, of an address of the terminal device based on the identifier of the terminal device and a context of the terminal device; and sending, by the UCF, the second information to the terminal device.

According to the foregoing method, the UCF may send the second information from the NF 2 to the terminal device.

In a possible implementation, the sending, by the UCF, the second information to the terminal device includes: learning, by the UCF, of a second service type based on the second message; and determining, by the UCF, a second port number based on a correspondence between a port number and a service type, and sending, to the terminal device by using a port corresponding to the second port number, the message sent by the NF to the terminal device.

According to a third aspect, an exemplary embodiment provides a communication method, including: receiving, by an AUSF network element, an identifier of a terminal device; generating a user plane connection security context for the terminal device, where the user plane connection security context includes a security parameter required for establishing a connection between the terminal device and a UCF; and sending the user plane connection security context to the terminal device.

According to the foregoing method, the AUSF may send the user plane connection security context to the terminal device for subsequent authentication.

In a possible implementation, an exemplary embodiment further includes: obtaining, by the AUSF from a subscriber data management (SDM), an identifier Single-Network Slice Selection Assistance Information (unique network slice selection assistance information, S-NSSAI) of one or more network slices that can be accessed by the terminal device, so that the generating a user plane connection security context for the terminal device includes: generating a user plane connection security context corresponding to each of the one or more network slices for the terminal device.

In a possible implementation, an exemplary embodiment further includes: receiving, by the AUSF, the identifier that is of the terminal device and that is sent by a UCF; and generating, by the AUSF, a security key based on the user plane connection security context and the identifier of the terminal device, and sending the security key to the UCF.

According to the foregoing method, the AUSF may send the security key to the UCF for verifying user equipment (UE).

In a possible implementation, the AUSF further receives an identifier that is of a network slice and that is sent by the UCF, and the AUSF generates a security key based on the identifier of the terminal device, the identifier of the network slice, and the user plane connection security context, and sends the security key to the UCF.

According to the foregoing method, the AUSF may send the security key corresponding to the network slice to the UCF for verifying the user equipment.

According to a fourth aspect, an exemplary embodiment provides a communication method, including: establishing, by a terminal device, a connection to a UCF; sending, by the terminal device, a first message to the UCF, where the first message includes first information and an identifier of the terminal device, and the first information is information that needs to be sent by the terminal device to a first network function; and receiving, by the terminal device, second information that is sent by the UCF and that is sent by the first network function to the terminal device.

In a possible implementation, an exemplary embodiment further includes: obtaining, by the terminal device, a user plane connection security context from an AUSF network element, where the user plane connection security context includes a security parameter required for establishing a connection between the terminal device and the UCF; and generating, by the terminal device, first security information based on the user plane connection security context, where the first message further carries the first security information that is used to perform security verification.

In a possible implementation, an exemplary embodiment further includes: receiving, by the terminal device, second security information sent by the UCF; and performing, by the terminal device, security verification on the second security information based on information obtained based on the security parameter.

In a possible implementation, an exemplary embodiment further includes: sending, by the terminal device, a discovery message to a network function repository function (NRF), where the message carries an NF type of the UCF; and receiving, by the terminal device, information that is about the UCF and that is returned by the NRF.

According to a fifth aspect, an exemplary embodiment provides an apparatus. The apparatus may be a UCF, or may be a chip or a circuit. The apparatus has functions of implementing the embodiments of the first aspect or the second aspect. The functions may be implemented by hardware, or may be implemented by hardware executing corresponding software. The hardware or the software includes one or more modules corresponding to the functions.

According to a sixth aspect, an exemplary embodiment provides an apparatus, including a processor and a memory. The memory is configured to store an instruction. When the apparatus runs, the processor executes the instruction stored in the memory, so that the apparatus performs the communication method in any one of the first aspect or the implementation methods of the first aspect, or the second aspect or the implementation methods of the second aspect. It should be noted that the memory may be integrated into the processor or may be independent of the processor.

According to a seventh aspect, an exemplary embodiment provides an apparatus. The apparatus includes a processor. The processor is configured to: be coupled to a memory, read an instruction in the memory, and perform, according to the instruction, the communication method in any one of the first aspect or the implementation methods of the first aspect, or the second aspect or the implementation methods of the second aspect.

According to an eighth aspect, an exemplary embodiment provides an apparatus. The apparatus may be an AUSF network element, or may be a chip or a circuit. The apparatus has functions of implementing the embodiments of the third aspect. The functions may be implemented by hardware, or may be implemented by hardware executing corresponding software. The hardware or the software includes one or more modules corresponding to the functions.

According to a ninth aspect, an exemplary embodiment provides an apparatus, including a processor and a memory. The memory is configured to store an instruction. When the apparatus runs, the processor executes the instruction stored in the memory, so that the apparatus performs the communication method in any one of the third aspect or the implementation methods of the third aspect. It should be noted that the memory may be integrated into the processor, or may be independent of the processor.

According to a tenth aspect, an exemplary embodiment provides an apparatus. The apparatus includes a processor. The processor is configured to: be coupled to a memory, read an instruction in the memory, and perform, according to the instruction, the communication method in any one of the third aspect or the implementation methods of the third aspect.

According to an eleventh aspect, an exemplary embodiment provides an apparatus. The apparatus may be a terminal device or may be a chip or a circuit. The apparatus has functions of implementing the embodiments of the fourth aspect. The functions may be implemented by hardware or may be implemented by hardware executing corresponding software. The hardware or the software includes one or more modules corresponding to the functions.

According to a twelfth aspect, an exemplary embodiment provides an apparatus, including a processor and a memory. The memory is configured to store an instruction. When the apparatus runs, the processor executes the instruction stored in the memory, so that the apparatus performs the communication method in any one of the fourth aspect or the implementation methods of the fourth aspect. It should be noted that the memory may be integrated into the processor or may be independent of the processor.

According to a thirteenth aspect, an exemplary embodiment provides an apparatus. The apparatus includes a processor. The processor is configured to: be coupled to a memory, read an instruction in the memory, and perform, according to the instruction, the communication method in any one of the fourth aspect or the implementation methods of the fourth aspect.

According to a fourteenth aspect, an exemplary embodiment further provides a readable storage medium. The readable storage medium stores a program or an instruction. When the program or the instruction is run on a computer, the communication method in the foregoing aspects is performed.

According to a fifteenth aspect, an exemplary embodiment further provides a computer program product including an instruction. When the computer program product runs on a computer, the computer performs the communication method in the foregoing aspects.

According to a sixteenth aspect, an exemplary embodiment further provides a system. The system includes a UCF, and the UCF may be configured to perform the steps performed by the UCF according to any one of the first aspect or the implementation methods of the first aspect, any one of the second aspect or the implementations methods of the second aspect, or the solutions provided in the embodiments.

In a possible embodiment, the system may further include an AUSF network element, and the AUSF network element may be configured to perform the steps performed by the AUSF network element in any one of the third aspect or the implementations methods of the third aspect, or the solutions provided in the embodiments.

In a possible embodiment, the system may further include another device, such as an SDM, an AMF, or a terminal device, that interacts with a session management network element and/or the user plane network element in the solutions provided in the embodiments.

These aspects or other aspects are clearer and comprehensible in descriptions of the following embodiments.

DESCRIPTION OF EMBODIMENTS

The following further describes in detail exemplary embodiments with reference to accompanying drawings. An exemplary operation method in method embodiments may also be applied to an apparatus embodiment or a system embodiment. In the description, unless otherwise stated, "a plurality of" means two or more. The term "and/or" in this specification is only an association relationship for describing associated objects, and represents that three relationships may exist. For example, A and/or B may represent the following three cases: Only A exists, only B exists, and both A and B exist.

A network architecture and a service scenario described in embodiments do not constitute a limitation on the technical solutions provided in the embodiments. A person of ordinary skill in the art may learn that, with evolution of a network architecture and emergence of a new service scenario, the technical solutions provided in the embodiments are also applicable to a similar technical problem.

Figure 1:
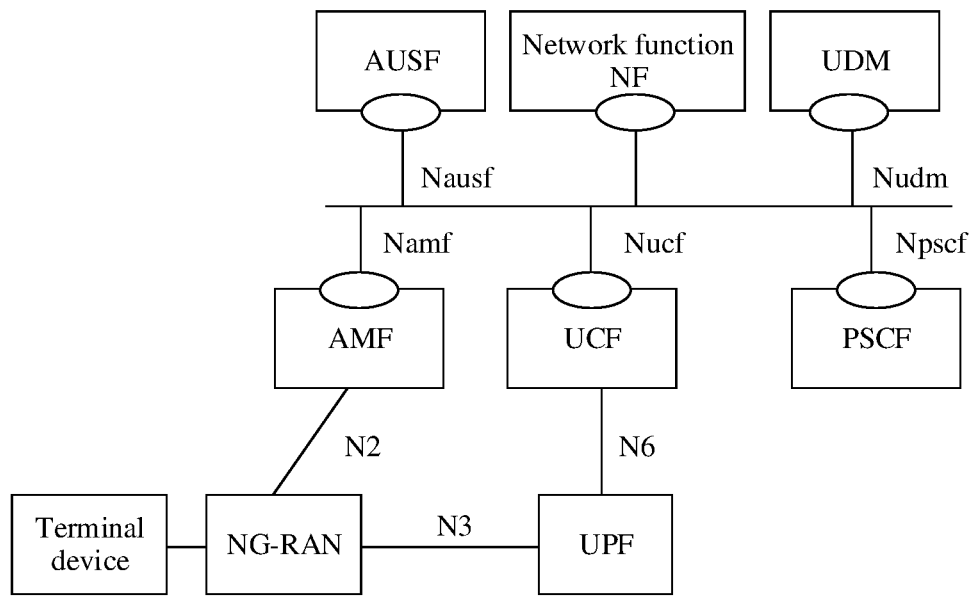
FIG. 1 is a schematic diagram of a possible network architecture according to an exemplary embodiment.

FIG. 1 is a schematic diagram of a possible network architecture to which an embodiment is applicable. Network elements involved in a communication method provided in an exemplary embodiment may include a terminal device, an AMF network element, an AUSF network element, an NRF network element, a UCM network element, and a UCF network element. Main functions of the network elements are as follows.

The terminal device is a device having a wireless communication function, and may be deployed on land, including an indoor device, an outdoor device, a handheld device, or a vehicle-mounted device, or may be deployed on a water surface (such as a ship), or may be deployed in the air (for example, on an aircraft, a balloon, or a satellite). The terminal device may be a mobile phone (mobile phone), a tablet computer (pad), a computer having a wireless transceiver function, a virtual reality (virtual reality, VR) terminal device, an augmented reality (augmented reality, AR) terminal device, a wireless terminal device in industrial control (industrial control), a wireless terminal device in unmanned driving (self driving), a wireless terminal device in telemedicine (remote medical), a wireless terminal device in a smart grid (smart grid), a wireless terminal device in transportation safety (transportation safety), a wireless terminal device in a smart city (smart city), a wireless terminal device in a smart home (smart home), or the like, or may be user equipment, a mobile station (mobile station, MS), or a terminal device (terminal device) in various forms.

A mobility management network element is responsible for access management and mobility management of the terminal device. In an exemplary embodiment, the mobility management network element includes a mobility management function in a mobility management entity (mobility management entity, MME) in a network framework in long term evolution (long term evolution, LTE), and supports an access management function. In 5G, the mobility management network element may be an AMF (access and mobility management function) network element. In future communication, for example, in 6G, the mobility management network element may still be an AMF network element or have another name. This is not limited in an exemplary embodiment.

An NRF network element has NF registration and discovery functions. In 5G, the network function repository function network element may be an NRF (network function repository function) network element. It may be understood that in the future communication, a network element responsible for network function registration and discovery functions may still be the NRF network element or may have another name. This is not limited in an exemplary embodiment.

An AUSF network element is used for authentication and authorization. In 5G, the network function storage function network element may be an AUSF network element. It may be understood that in the future communication, a network element responsible for authentication and authorization may still be the AUSF network element or may have another name. This is not limited in an exemplary embodiment.

A data management network element is configured to store user authentication data and user subscription data. In 5G, the data management network element may be a UDM network element. It may be understood that in the future communication, a network element responsible for storing user authentication data and user subscription data may still be the UDM network element or may have another name. This is not limited in an exemplary embodiment.

A network function network element on a network side has a function of processing and controlling one or more network services, for example, a location management function (LMF), a near field communication management function (proximity service communication function, PSCF), or a broadcast management function (BMF).

The user plane connection (user plane connection function, UCF) network element is a newly added network element, and establishes a connection to the terminal device and a plurality of NFs on the network side, to transmit exchanged messages between the terminal device and the plurality of NFs.

It may be understood that the foregoing network elements may be network elements in a hardware device, or may be software functions running on dedicated hardware, or may be virtualization functions instantiated on a platform (such as a cloud platform).

In the prior art, when the terminal device and the plurality of network functions on the network side communicate with each other through a user plane connection, a plurality of corresponding application interfaces each need to be defined, and the terminal device and a network function on the network side each need to implement a corresponding application interface function. This increases technical complexity on the terminal device side and the network side. Further, the plurality of network functions further need to separately process a connection to the terminal device, for security, authorization, and the like. This also increases complexity of the network functions on the network side.

To simplify communication between the terminal device and the network functions, in this embodiment, the UCF is deployed on the network side. A connection is established between the UCF and the terminal device through a user plane, and connections are also established between the UCF and the plurality of NFs. In addition, the exchanged messages between the terminal device and the plurality of NFs on the network side are transmitted by the UCF.

Figure 2A:
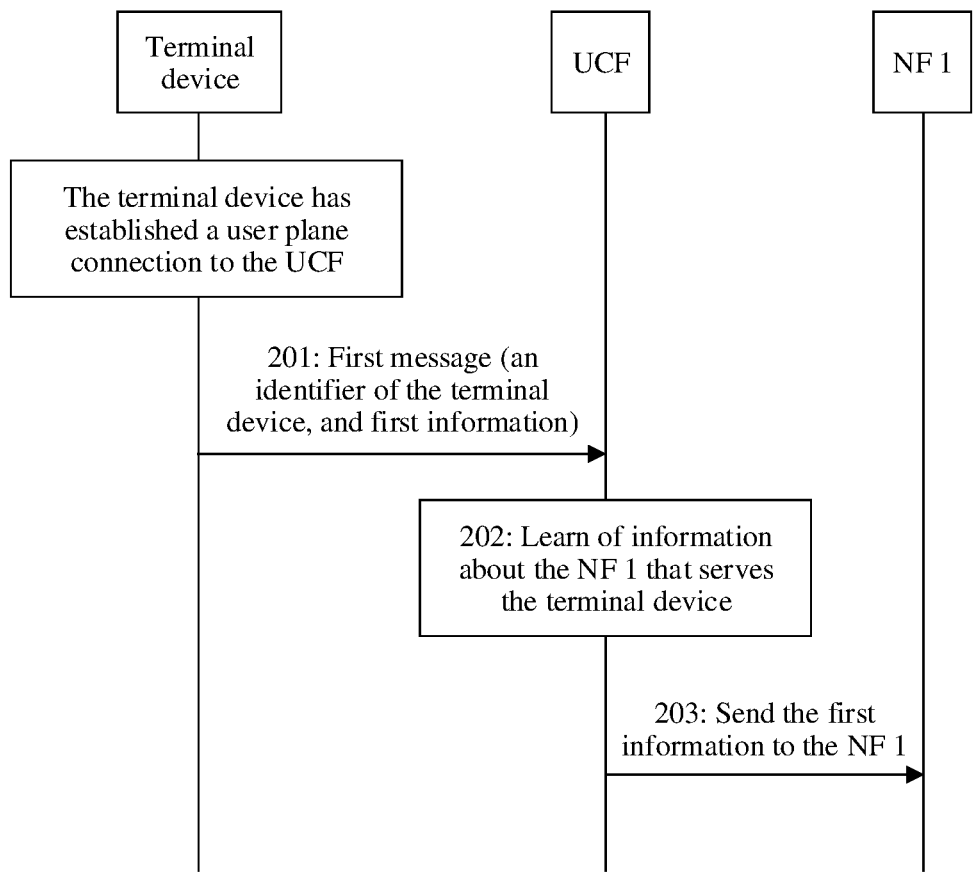
FIG. 2a and FIG. 2b are schematic diagrams of a communication method according to an exemplary embodiment.
Figure 2B:
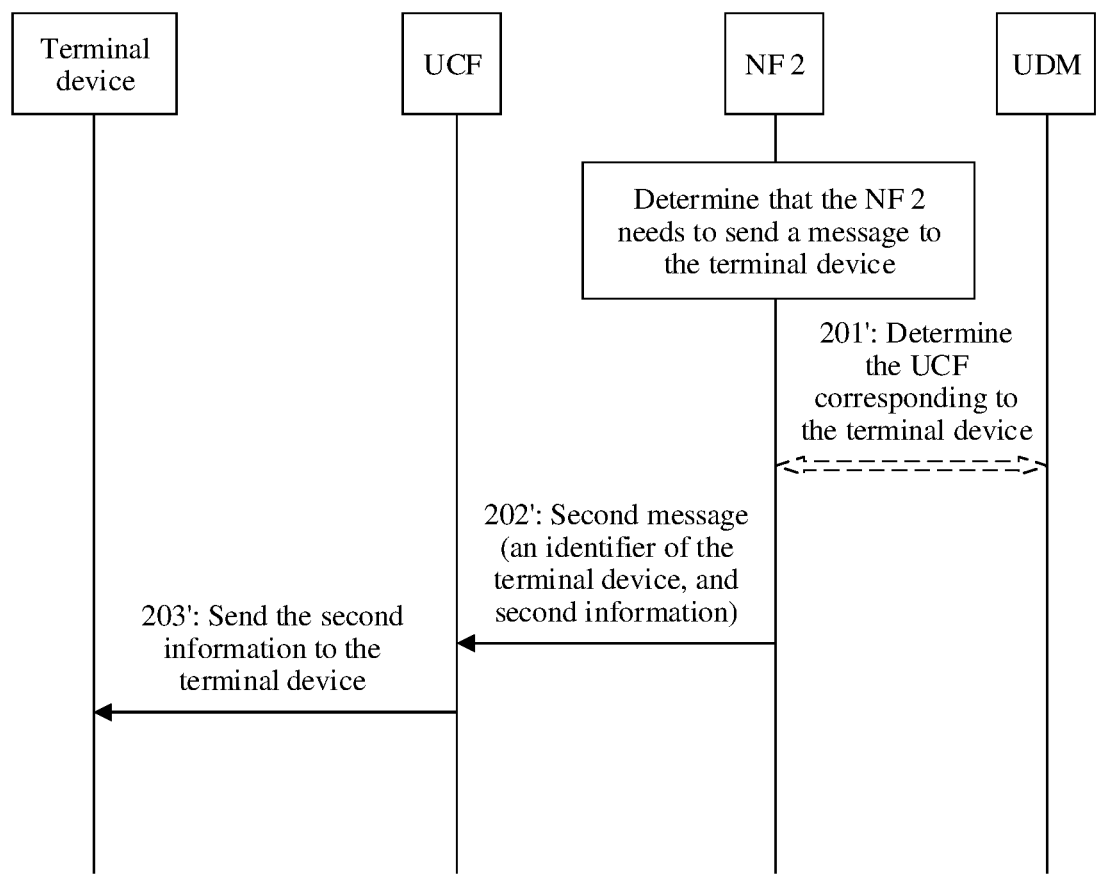

Based on the network architecture in FIG. 1, FIG. 2a and FIG. 2b show a communication method according to an exemplary embodiment. The communication method may be used to resolve the foregoing problem. The exemplary embodiment includes the following content.

A terminal device has established a user plane connection to a UCF. For an establishment process, refer to an embodiment in FIG. 3.

(1) An uplink transmission process shown in FIG. 2a

In step 201, when needing to perform a first service, the terminal device sends a first message to the UCF based on a first service type of the first service, where the first message includes an identifier of the terminal device and first information sent by the terminal device to a NF providing the first service.

The identifier of the terminal device is used to identify the terminal device, and may be an IMSI, a subscription permanent identifier (SUPI), or a public user identity Public user equipment identity. It should be noted that, in this embodiment, a specific form of the identifier of the terminal device transmitted between network elements is not clearly limited. The form of the identifier of the terminal device in each step may also be changed, provided that the terminal device can be uniquely identified. For example, a network element may change a received public user identity to an SUPI, and identify, in a subsequent procedure, the terminal device by using the SUPI.

That the terminal device sends a first message to the UCF based on a first service type of the first service, for example, includes any one of the following embodiments.

In embodiment 1: The terminal device determines the first service type, and sends the first message including first service type information to the UCF.

In embodiment 2: The terminal device obtains a correspondence between a port number and a service type, determines, based on the first service type, that a port number is a first port number, and sends an uplink message to the UCF by using a port corresponding to the first port number. The terminal device may obtain, in a process in which the terminal device establishes a connection to the UCF, the correspondence between a port number and a service type from the UCF.

In step 202, the UCF receives the first message from the terminal device, learns of a first service type based on the first message, and learns, based on the first service type information and the identifier of the terminal device, of information about an NF 1 that serves the terminal device.

Correspondingly, the UCF learns of the first service type based on the first service type information in the first message or the first port number corresponding to the port over which the first message is received. The information about the NF 1 may be an address of the NF or an NF ID.

For example, the UCF may learn of the NF 1 that serves the terminal device in the following two exemplary embodiments.

In embodiment 1, the UCF queries, based on the first service type and the identifier of the terminal device, local information, to determine the NF 1 that serves the terminal device, where a local context includes a correspondence between a service type and an NF. For example, the UCF stores a correspondence between the first service type and the NFL For example, the terminal device has previously performed transmission with the NF 1 of messages related to the first service, so that the UCF has obtained the correspondence and stores the correspondence locally.

Alternatively, in embodiment 2, the UCF queries, based on the first service type and the identifier of the terminal device, the UDM, to learn of the NF 1 that serves the terminal device.

In step 203, the UCF sends the first information to the NF 1 that serves the terminal device.

After learning of the NF 1 that serves the terminal device, the UCF sends the first information in the first message to the NF 1 that serves the terminal device.

Therefore, in the uplink transmission process, the UCF may send the first information from the terminal device to the corresponding NF 1.

(2) A downlink transmission process shown in FIG. 2*b*

In step 201', when needing to send a message to the terminal device, an NF 2 determines the UCF corresponding to the terminal device.

That the NF 2 determines the UCF includes the following exemplary embodiments:

In embodiment 1, the NF 2 sends an identifier of the terminal device to the UDM, to obtain, from the UDM, the UCF corresponding to the terminal device.

Alternatively, in embodiment 2, the NF 2 obtains, based on the identifier of the terminal device and from the local information, the UCF corresponding to the terminal device.

In step 202', the NF 2 sends a second message to the UCF, where the second message includes the identifier of the terminal device, and second information sent by the NF 2 to the terminal device.

In step 203', the UCF learns of an address of the terminal device based on the identifier of the terminal device and context information of the terminal device, and the UCF sends the second information to the terminal device.

When establishing a connection to the terminal device, the UCF stores the context information of the terminal device, and the UCF learns of the address of the terminal device based on the identifier of the terminal device and from the context information of the terminal device.

Optionally, that the UCF sends the second information to the terminal device may be, for example: The UCF learns of a second service type based on the second message; and the UCF determines a second port number based on a correspondence between a port number and a service type, and sends, to the terminal device by using a port corresponding to the second port number, the message sent by the NF to the terminal device.

Therefore, in the downlink transmission process, the UCF may send the second information from the NF 2 to the terminal device.

The NF 1 in the uplink transmission process and the NF 2 in the downlink transmission process may be the same network element, or may be different network elements. The uplink transmission process and the downlink transmission process may be two independent processes (some services have only uplink messages, and some services have only downlink messages), or may be combined with each other, but have no time sequence relationship (some services have both uplink messages and downlink messages).

It can be learned from the foregoing embodiment description that, uplink messages and downlink messages between the terminal device and the NFs are transmitted by the UCF, and the terminal device does not need to separately establish a connection to each NF, configure an interface protocol for each NF, and the like. In this way, functions of the terminal device and functions of the NFs are simplified.

Figure 3:
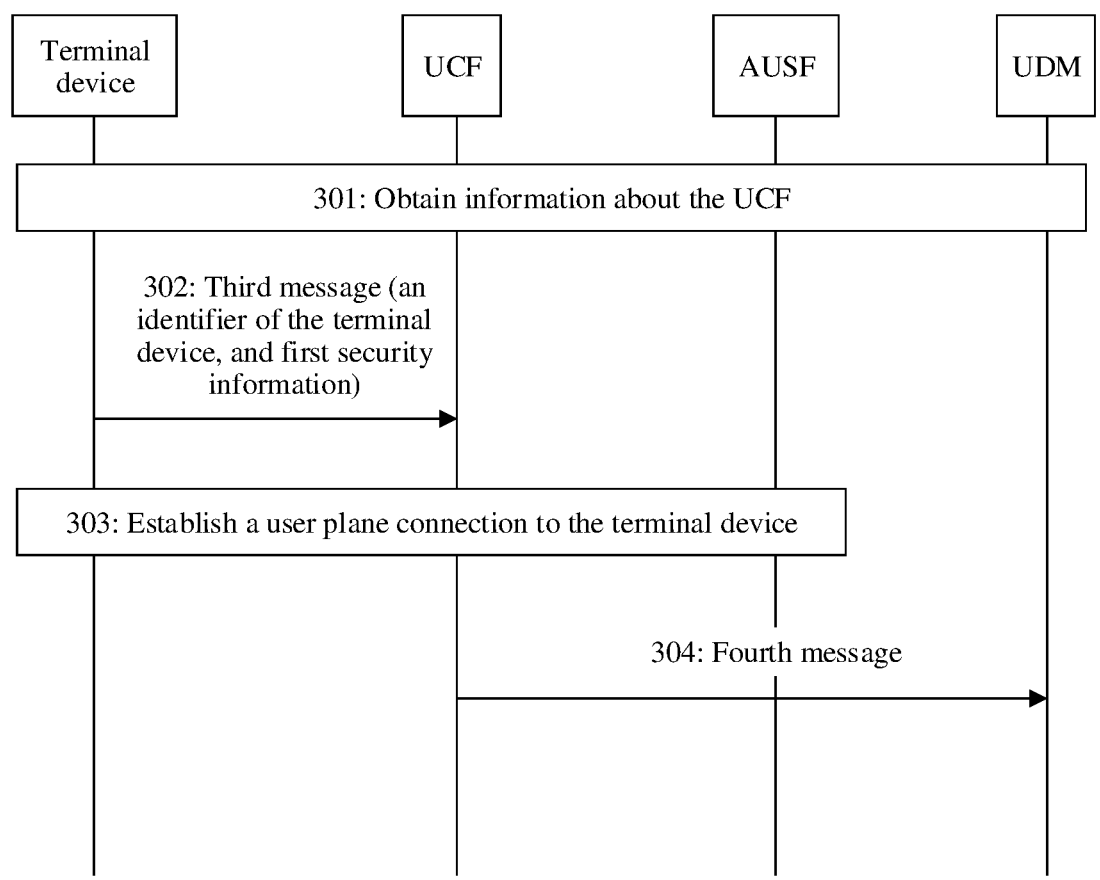
FIG. 3 is an example diagram of a communication method according to an exemplary embodiment.

FIG. 3 is a communication method according to an exemplary embodiment. The communication method relates to a process in which a terminal device establishes a connection to a UCF, and includes the following steps.

In step 301, the terminal device sends a UCF type to an NRF, requests to discover the UCF, and obtains information about the UCF from the NRF.

The terminal device may send a request message to the NRF. The request message includes the UCF type. Optionally, the request message may further carry information S-NSSAI about a network slice and/or a location of the terminal device. The information about the network slice is used to indicate that the terminal device needs information that is about the UCF and that is in the network slice. The NRF stores information about deployed UCFs, and provides the UCF that meets a requirement for the terminal device.

In step 302, the terminal device sends a third message to the UCF, to request to establish a connection, where the third message includes an identifier of the terminal device.

Optionally, the third message further includes a service type that is used to indicate that the terminal device needs to perform a service. For example, the service type may be an identifier of a network service (for example, an identifier of a positioning service) or an identifier of an application layer protocol (for example, a secure user-plane location (SUPL) corresponding to a positioning service). Because application layer protocols used by different services may be different, the terminal device provides the service type to the UCF, so that the UCF allocates a port corresponding to the service, to transmit a message. For example, the terminal device receives a message from the UCF by using the corresponding port and sends a message to the UCF by using the corresponding port.

Optionally, the third message further includes first security information, and the first security information is generated by the terminal device based on a user plane connection security context. The user plane connection security context is obtained from an AUSF in a process in which the terminal device registers to a network. For an exemplary process of obtaining the user plane connection security context, refer to descriptions of related steps.

In step 303, after receiving the third message, the UCF establishes a user plane connection to the terminal device.

Optionally, if the third message further includes the service type, the UCF allocates a port number corresponding to the user plane connection based on the service type, stores a correspondence between the service type and the port number, and sends the correspondence to the terminal device.

Optionally, if the third message further includes the first security information, the UCF may further verify the terminal device by using the AUSF. If the verification succeeds, the UCF establishes the user plane connection to the terminal device. For example, the UCF obtains a security key from the AUSF based on the identifier of the terminal device, and performs verification based on the security key and the first security information. Further, the UCF may further generate second security information, and send the second security information to the terminal device. The second security information is used by the terminal device to verify the UCF. For an exemplary verification process, refer to descriptions of related steps.

In step 304, the UCF sends a fourth message to a UDM, where the fourth message includes the identifier of the terminal device, an identifier of the UCF, and an NF type of the UCF.

The fourth message is used to request to register a network function, that is, notify the UDM that the UCF provides a service for the terminal device. The UDM stores the correspondence.

It may be understood that an embodiment in FIG. 3 is a possible manner in which the terminal device establishes the connection to the UCF, and does not constitute a limitation on the technical solutions provided in the embodiments. A person of ordinary skill in the art may learn that with evolution of a network architecture and emergence of a new service scenario, another possible manner in which the terminal device establishes the connection to the UCF is also applicable to an exemplary embodiment.

The following describes in detail the communication methods in the foregoing embodiments with reference to the exemplary embodiments in FIG. 4 to FIG. 7.

Figure 4:
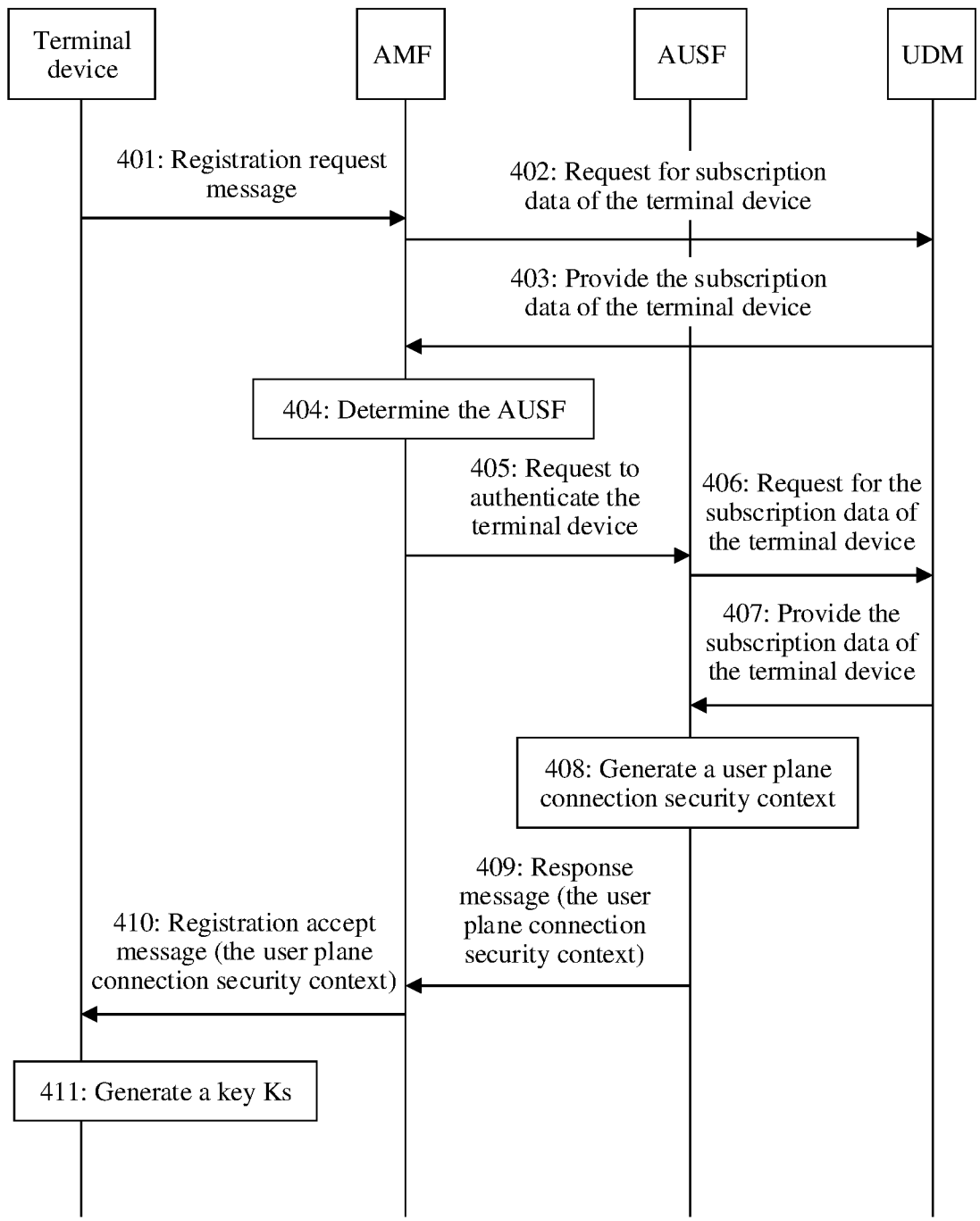
FIG. 4 is a schematic diagram of a signaling procedure according to an exemplary embodiment.

FIG. 4 is a schematic diagram of a communication method according to an embodiment. When a terminal device registers to a network, that a network side provides, for the terminal device, a user plane connection security context required when the terminal device accesses a UCF includes the following steps.

In step 401, the terminal device sends a registration request message (such as "REGISTRATION REQUEST") to an AMF, where the registration request message includes an identifier of the terminal device.

For example, when needing to access the network in a case such as power-on, the terminal device may send the registration request to the AMF in a core network by using an access network.

In step 402, the AMF sends a request message (such as "Nudm_SDM_Get Request") to the UDM, where the request message carries the identifier of the terminal device and is used to request for subscription data of the terminal device.

In step 403, the UDM determines, based on the identifier of the terminal device, the subscription data corresponding to the terminal device, and sends, to the AMF, a response message (such as "Nudm_SDM_Get response") used to provide the subscription data of the terminal device for the AMF.

In step 404, the AMF determines an AUSF in a home network corresponding to the terminal device.

To verify authenticity of the terminal device, the AMF needs to request the AUSF function to authenticate the terminal device.

For example, the AMF may discover and select, by using an NRF, an identifier and network address information that are of the AUSF deployed on the home network corresponding to the terminal device. For discovering and selecting the AUSF by using the NRF, refer to related descriptions in the prior art. Details are not described herein.

In step 405, the AMF sends a request message (such as "Nausf_UE Authentication_Authenticate Request") to the AUSF, where the request message includes the identifier of the terminal device and is used to request to authenticate the terminal device.

In step 406, the AUSF sends a request message (such as "Nudm_Authentication_Get Request") to the UDM, where the request message includes the identifier of the terminal device and is used to request to obtain the subscription data required for authenticating the terminal device.

In step 407, the UDM sends a response message (such as "Nudm_Authentication_Get response") to the AUSF, where the response message includes the subscription data that is of the terminal device and that is provided for the AUSF.

Optionally, the subscription data includes user plane connection security context indication information, and the indication information is used to indicate whether the AUSF needs to provide, for the terminal device, the user plane connection security context required when the terminal device establishes a connection to the UCF. The user plane connection security context is a user plane connection security context required for establishing the connection between the terminal device and the UCF.

The user plane connection security context indication information may be explicit or may be implicit. For example, the explicit user plane connection security context indication information may be an exemplary IE. When a value of the IE is 1, it indicates that the user plane connection security context needs to be provided for the terminal device. When a value of the IE is 0, it indicates that the user plane connection security context does not need to be provided for the terminal device. If a GBA (generic bootstrapping architecture) mechanism is used for authentication and security performed when the terminal device establishes the connection to the UCF, the user plane connection security context indication information may be a "GBA Context_Required".

Optionally, in a scenario in which network slices need to be distinguished, when the terminal device can access one or more network slices, the subscription data includes an identifier S-NSSAI of the one or more network slices that can be accessed by the terminal device, and indicates that the AUSF needs to generate a corresponding user plane connection security context for each of the one or more network slices.

In step 408, the AUSF generates the user plane connection security context.

The AUSF may determine by default that it is needed to generate the user plane connection security context for the terminal device, or the AUSF may determine, based on the user plane connection security context indication information, whether it is needed to generate the user plane connection security context. The user plane connection security context indication information may be from the subscription data in step 407, or may be from the terminal device (when the terminal device transfers the user plane connection security context indication information to the AMF in step 401, and then the AMF transfers the user plane connection security context indication information to the AUSF in step 405).

Optionally, in a scenario in which network slices need to be distinguished, the subscription data in step 407 includes an identifier of one or more network slices that can be accessed by the terminal device, and the AUSF generates a user plane connection security context corresponding to each of the one or more network slices.

For example, the user plane connection security context includes a security parameter. The security parameter may be used for verification between the AUSF and the terminal device, and the security parameter may be a character string. For example, the AUSF and the terminal device each may generate a key Ks based on the security parameter, and perform verification based on the key Ks. The following provides an example for description. When an authentication and key agreement (AKA) mechanism is used for the authentication between the AUSF and the terminal device, and a GBA mechanism is used for authentication and security that are performed when the terminal device establishes the connection to the UCF, the AUSF provides the user plane connection security context to the terminal device, and the security parameter included in the user plane connection security context may be a character string.

Subsequently, the terminal device and the AUSF each generate a key Kausf by using a shared root key (the AUSF may obtain the shared root key from the subscription data), and then each further performs an operation based on the security parameter in the user plane connection security context and Kausf, to obtain the key Ks. The terminal device and the AUSF each store Ks for a subsequent verification process. For an exemplary verification process, refer to descriptions of related steps in an embodiment in FIG. 5.

In a scenario in which network slices need to be distinguished, when the terminal device is allowed to access one or more network slices, the AUSF may allocate a security parameter to each of the one or more network slices. The AUSF provides, for the terminal device, one or more user plane connection security contexts corresponding to the one or more network slices. The terminal device may obtain a correspondence between an identifier S-NSSAI of a network slice and a security parameter by using the one or more user plane connection security contexts corresponding to the one or more network slices. The terminal device and the AUSF each generate and store one or more keys Ks corresponding to the one or more network slices, for a subsequent verification process.

In step 409, the AUSF sends a response message (Nausf Terminal device Authentication_Authenticate Response) to the AMF, where the response message includes the user plane connection security context.

Optionally, the response message may further include another connection security context of the terminal device, and the other connection security context is a key used for a control plane connection between the terminal device and the core network.

In step 410, the AMF sends a registration accept message to the terminal device, to notify the terminal device that the registration request of the terminal device is accepted by the network, where the registration accept message includes the user plane connection security context for establishing a secure connection to the UCF.

Optionally, the registration accept message may further include another user plane connection security context provided for the terminal device.

In step 411, the terminal device receives the registration accept message, and obtains the user plane connection security context for establishing the secure connection to the UCF.

Further, the terminal device generates the key Ks based on the security parameter in the user plane connection security context.

Optionally, in a scenario in which network slices need to be distinguished, the terminal device generates and stores, based on one or more user plane connection security contexts that correspond to one or more network slices and that are obtained from the AMF, one or more keys Ks corresponding to the one or more network slices.

Figure 5:
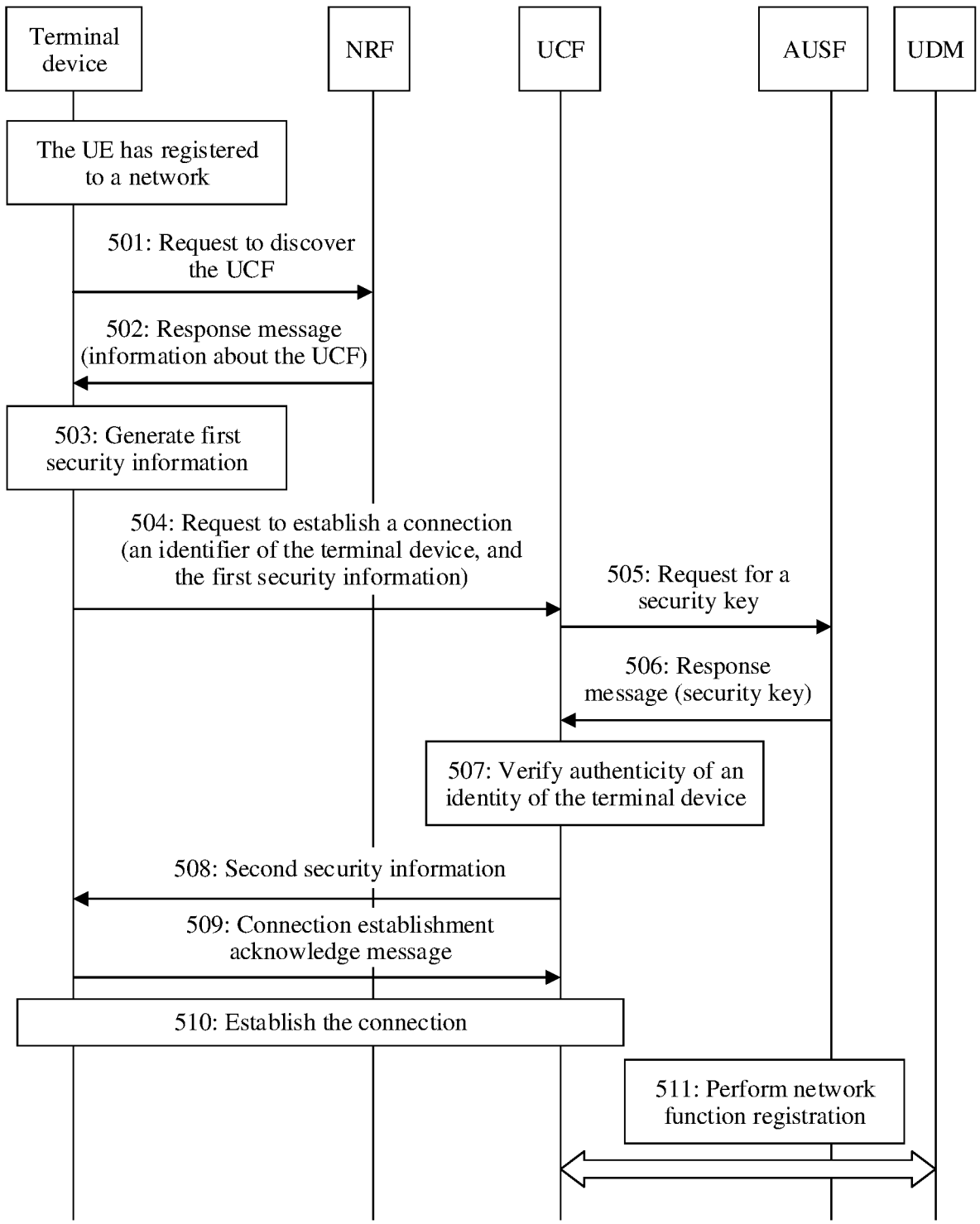
FIG. 5 is a schematic diagram of another signaling procedure according to an exemplary embodiment.

FIG. 5 is a schematic diagram of a communication method according to an embodiment. An exemplary embodiment for establishing a connection between a terminal device and a UCF includes the following steps.

The terminal device performs a registration procedure, to obtain a user plane connection security context. For exemplary descriptions, refer to the embodiment corresponding to FIG. 4.

In step 501, the terminal device sends a discovery request (such as an NF Discovery Request) to an NRF, to request to discover the UCF, where request information includes a UCF type, S-NSSAI, and a location of the terminal device.

In step 502, the NRF sends a response message (such as an NF Discovery Response) that carries information about the UCF.

The NRF stores information about deployed UCFs and provides the information about the UCF that meets a requirement for the terminal device. The information about the UCF includes an identifier (UCF ID) of the UCF and a network address of the UCF.

In step 503, the terminal device selects, based on the information that is about the UCF and that is provided by the NRF in step 502, the UCF that needs to be connected, and generates first security information, where the first security information is generated based on the user plane connection security context.

The terminal device selects the UCF, determines a key Ks, and generates the first security information based on the key Ks. The first security information is used for identity verification between the terminal device and the UCF.

Optionally, in a scenario in which network slices need to be distinguished, the terminal device selects the UCF, determines a key Ks corresponding to a slice on which the UCF is located, and generates the first security information based on the key Ks. The first security information is used for identity verification between the terminal device and the UCF.

The following describes a process of generating the first security information by using an example: The terminal device determines a first random number RAND_1, and generates Ks_UCF_1 based on the UCF ID (which is an optional parameter), the first random number, and the key Ks, where Ks_UCF_1 is a symmetric key and includes a cipher key and an integrity protection key. The first security information includes the first random number RAND_1, and an encrypted ciphertext Res_1 obtained through performing an encryption operation on RAND_1 by using Ks_UCF_1.

In step 504, the terminal device sends a request message (such as a Connection Establish Request) to the UCF, to request to establish the connection, where the request message includes the first security information and an identifier of the terminal device.

Optionally, the request message further includes a service type required by the terminal device.

In step 505, after receiving the request message (such as the Connection Establish Request) from the terminal device, the UCF sends a request message (such as a UE Security Context request) to an AUSF, to request for a security key, where the request message includes the identifier of the terminal device.

For example, the request message includes the identifier of the terminal device, the first random number RAND_1, and the identifier of the UCF. In a scenario in which network slices need to be distinguished, the request message sent by the UCF to the AUSF may further include an identifier of a corresponding network slice.

In step 506, the AUSF sends a response message (such as a UE Security Context response) to the UCF, where the response message includes the security key.

The security key is obtained based on the identifier of the terminal device, the identifier of the network slice (optional), and the user plane connection security context of the terminal device that are provided by the UCF, and the security key is used for subsequent verification between the terminal device and the UCF.

For example, the AUSF may determine the key Ks based on the identifier of the terminal device and the identifier of the network slice (optional). The AUSF further performs, based on the key Ks, the first random number RAND_1, and the identifier of the UCF, an operation same as that performed by the terminal device, to obtain Ks_UCF_2, where ks_UCF_2 is the security key obtained by the AUSF.

When Ks stored in the terminal device and Ks stored in the AUSF are the same, Ks_UCF_2 obtained through performing an operation should be the same as Ks_UCF_1. The AUSF includes, in the response message, Ks_UCF_2 obtained through calculation, and provides the response message for the UCF.

In step 507, the UCF verifies authenticity of an identity of the terminal device based on the security key obtained from the AUSF, and the first security information.

In an exemplary embodiment, the UCF may decrypt, based on the obtained Ks_UCF_2, the Res_1 provided by the terminal device in step 503, and compare whether a decrypted data value is the same as the first random number RAND_1. If the decrypted data value is the same as the first random number RAND_1, the UCF determines that the terminal device has a correct key. For example, the authenticity of the identity of the terminal device is proved, and step 510 may be subsequently performed, to establish the connection to the terminal device. If the decrypted data value is different from the first random number RAND_1, the UCF may refuse to establish the connection to the terminal device.

Optionally, to verify authenticity of an identity of the UCF by the terminal device, this embodiment may further include step 508 and step 509.

In step 508, the UCF generates second security information based on the security key and sends the second security information to the terminal device.

The second security information may include a second random number RAND_2, and a result Res_2 obtained through performing an encryption operation on RAND_2 based on Ks_UCF_2 by the UCF.

In step 509, the terminal device verifies the second security information based on information obtained based on the security parameter.

In an exemplary embodiment, the terminal device performs a decryption operation on Res_2 by using Ks_UCF_1 of the terminal device, and compares an operation result with the second random number RAND_2. If the operation result is the same as the second random number RAND_2, the UCF has a correct key. For example, the authenticity and correctness of the identity of the UCF is proved, and the terminal device sends a connection establishment acknowledgement (Establish Connection ACK) message to the UCF.

In step 510, the UCF establishes the connection to the terminal device.

The UCF provides a message transfer service for the terminal device, and the UCF stores context information of the message transfer service provided for the terminal device. The context information includes the identifier of the terminal device, the user plane connection security context, and the like.

In step 504, if the terminal device provides the service type, and the UCF determines to transmit messages of services by using different port numbers, the UCF allocates a port number corresponding to a service, and provides a correspondence between the port number and the service type to the terminal device, so that the terminal device can enable a message related to the service to be sent or received over a port of the port number corresponding to the service.

In step 511, the UCF sends, to a UDM, a request (such as a Serving NF Registration Request) for perform network function registration, where a request message includes the identifier of the terminal device, the identifier of the UCF, and an NF type of the UCF.

The UDM stores information provided by the UCF, so that the UDM can obtain the information about the UCF that provides a service for the terminal device.

Figure 6:
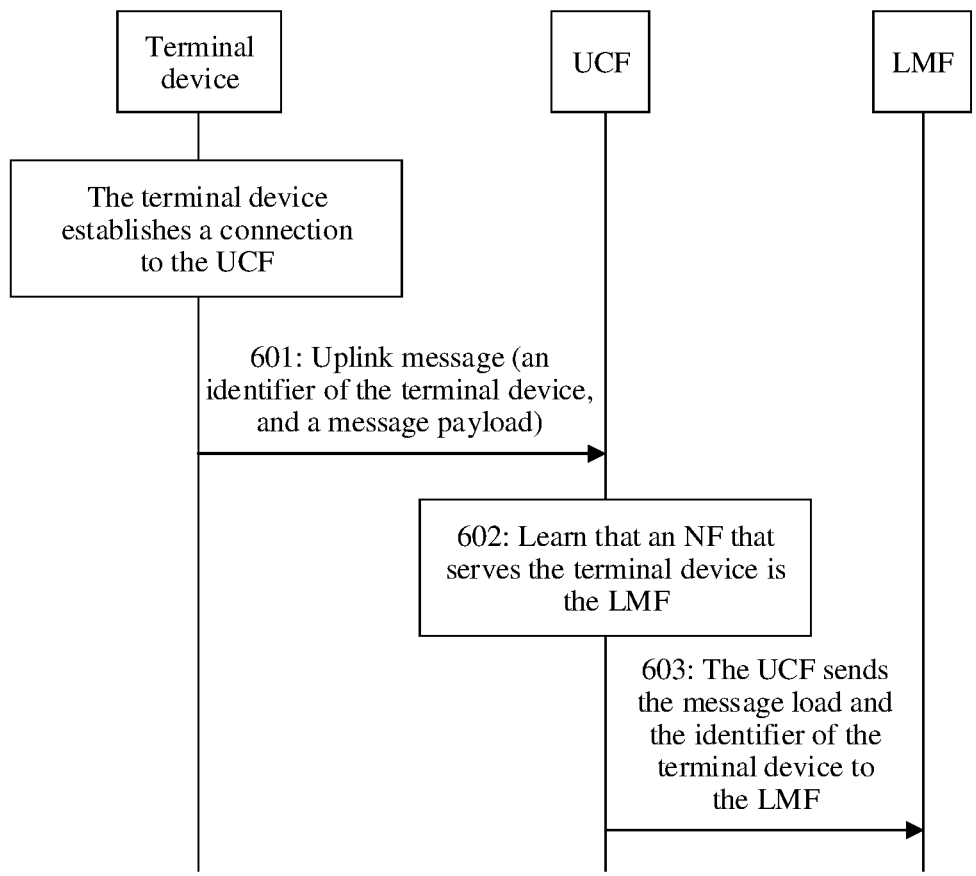
FIG. 6 is a schematic diagram of another signaling procedure according to an exemplary embodiment.

FIG. 6 is a schematic diagram of a communication method according to an embodiment. The communication method relates to a process in which a terminal device sends a message to an NF by using a UCF. A positioning service is used as an example below, and a network function NF that provides the positioning service is an LMF.

An exemplary embodiment includes the following steps:

The terminal device establishes a connection to the UCF. For exemplary descriptions, refer to the embodiment corresponding to FIG. 5.

In step 601, when needing to perform the positioning service, the terminal device sends an uplink message to the UCF based on a service type of the positioning service, where the uplink message includes an identifier of the terminal device and a message payload 1 that needs to be sent to the network function NF that provides the positioning service.

The identifier of the terminal device may be a public identity or a permanent public identity.

That the terminal device sends the uplink message to the UCF based on the service type of the positioning service that needs to be performed may include any of the following embodiments:

In an embodiment 1, the terminal device sends the uplink message including the service type to the UCF.

In an embodiment 2, if the terminal device obtains a correspondence between a port number and a service type from the UCF when the terminal device establishes the connection to the UCF, reference is made to step 510, and the terminal device determines a port number 1 based on the positioning service, and sends the uplink message to the UCF by using a port corresponding to the port number 1.

For example, optionally, the terminal device may alternatively encrypt the message payload 1 by using Ks_UCF_1.

In step 602, the UCF receives the uplink message, the UCF learns of the service type based on the uplink message, and the UCF learns, based on the service type and the identifier of the terminal device, that an NF that serves the terminal device is the LMF.

That the UCF learns of the service type based on the uplink message may include any of the following manners.

When the uplink message carries information about the service type, the UCF learns of the information about the service type.

Alternatively, the UCF learns of the service type based on the port number 1 corresponding to the port over which the uplink message is received, and the correspondence between a port number and a service type.

That the UCF determines, based on the service type and the identifier of the terminal device, the NF that serves the terminal device may include any of the following embodiments:

In embodiment 1, the UCF may subscribe to, from a UDM, information about the NF that serves the terminal device, and when no NF serves the terminal device, the UCF discovers and determines a corresponding NF from an NRF.

In embodiment 2, if the terminal device has previously performed a service with an NF via the UCF, and a correspondence between a service type and a corresponding NF is stored in a local context of the UCF, the UCF queries, based on the identifier of the terminal device and the service type, the local context, to determine the NF that serves the terminal device.

Optionally, if the terminal device encrypts the message payload, the UCF decrypts the message payload by using Ks_UCF_2.

In step 603, the UCF sends the identifier of the terminal device and the message payload to the LMF.

Figure 7:
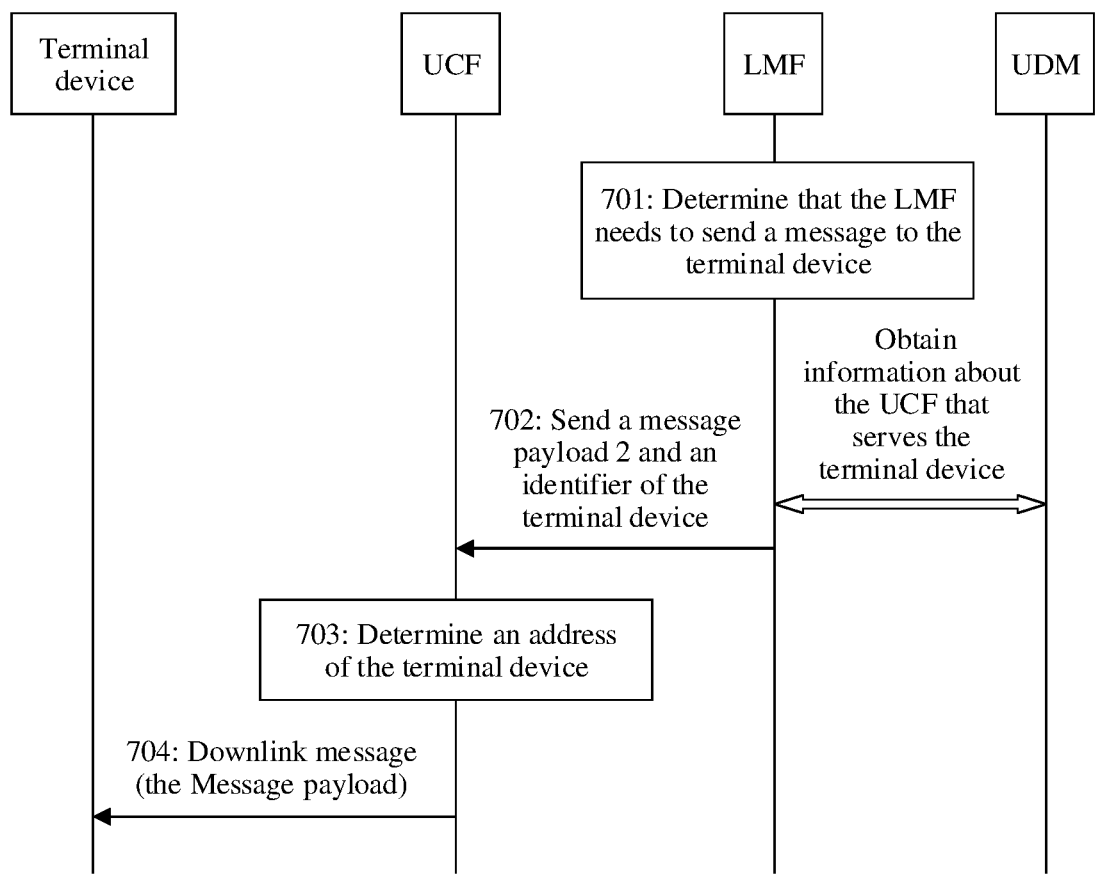
FIG. 7 is a schematic diagram of another signaling procedure according to an exemplary embodiment.

FIG. 7 is a schematic diagram of a communication method according to an embodiment. The communication method relates to a process in which a network side sends a message to a terminal device by using a UCF. Using a positioning service and an LMF as an example, an exemplary embodiment includes the following steps.

In step 701, determine information about the UCF when the LMF needs to send a message to the terminal device.

The determining information about the UCF includes the following exemplary embodiments.

The LMF sends, to the UDM, a request message (such as a Serving CMFEF inquiry request response) that carries an identifier of the terminal device, and obtains, from the UDM, the information about the UCF that serves the terminal device. The UDM obtains a correspondence between the identifier of the terminal device and the UCF in step 511.

The LMF locally obtains the UCF corresponding to the terminal device.

In step 702, the LMF sends, to the UCF, the identifier of the terminal device and a message payload 2 sent by the LMF to the terminal device.

In step 703, the UCF determines an address of the terminal device based on the identifier of the terminal device and stored context information of the terminal device. For exemplary descriptions, refer to related steps in the embodiment corresponding to FIG. 2b.

Optionally, the UCF encrypts the message payload 2 by using Ks_UCF_2.

In step 704, the UCF sends a downlink message to the terminal device, where the downlink message includes encrypted message payload 2.

For example, when the terminal device establishes a connection to the UCF, if the UCF provides a corresponding IP address and a port number corresponding to a port over which a network service is sent and received, the UCF determines a second address and a second port number based on a second service provided by the LMF, and sends the downlink message to the terminal device by using the corresponding second address and a port corresponding to the second port number.

Optionally, if the UCF encrypts the message payload 2, the terminal device decrypts the message payload 2 by using Ks_UCF_1.

The foregoing describes the solutions provided in an exemplary embodiment mainly from the perspective of interaction between network elements. It may be understood that the network elements include corresponding hardware structures and/or software modules for performing the foregoing functions. A person skilled in the art should easily be aware that, in combination with units and algorithm steps of the examples described in the embodiments, an exemplary embodiment may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope.

Figure 8:
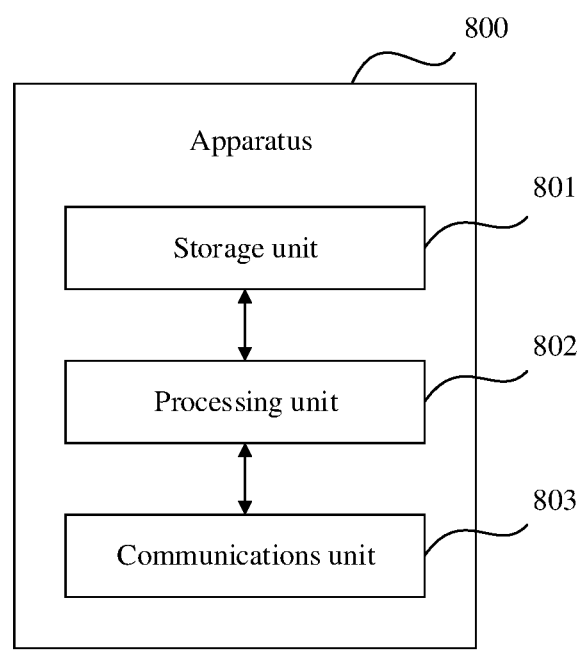
FIG. 8 is a schematic diagram of an apparatus according to an exemplary embodiment.

When an integrated unit is used, FIG. 8 is a possible exemplary block diagram of an apparatus according to an embodiment. An apparatus 800 may exist in a form of software, or may be a UCF, or may be a chip in a UCF. The apparatus 800 includes a processing unit 802 and a communications unit 803. The communications unit 803 may include a receiving unit and a sending unit. The processing unit 802 is configured to control and manage an action of the apparatus 800. The communications unit 803 is configured to support the apparatus 800 in communicating with another network entity (such as an AUSF, an SDM, or an NF). The apparatus 800 may further include a storage unit 801, configured to store program code and data that are of the apparatus 800.

The processing unit 802 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits that are described with reference to content disclosed in an exemplary embodiment. The processor may be a combination of processors implementing a computing function, for example, including a combination of one or more microprocessors, or a combination of the DSP and a microprocessor. The communications unit 803 may be a communications interface, a transceiver, a transceiver circuit, or the like. The communications interface is an umbrella term. In an exemplary implementation, the communications interface may include a plurality of interfaces, for example, may include an interface between the UCF and the AUSF, the SDM, or the NF, and/or another interface. The storage unit 801 may be a memory.

The processing unit 802 may support the apparatus 800 in performing actions of the UCF in the foregoing method examples. For example, the processing unit 802 may support the apparatus 800 in performing step 202 in FIG. 2a, step 202' in FIG. 2b, step 303 in FIG. 3, steps 507, 508, and 510 in FIG. 5, 602 in FIG. 6, 703 in FIG. 7, and the like. The communications unit 803 may support communication between the apparatus 800 and another device. For example, the communications unit 803 may support the apparatus 800 in performing step 201 and step 203 in FIG. 2a, steps 202' and 203' in FIG. 2b, step 302 and step 304 in FIG. 3, step 504 to step 506, step 508, and step 509 in FIG. 5, step 601 and step 603 in FIG. 6, step 702 and step 703 in FIG. 7, and the like.

Figure 9:
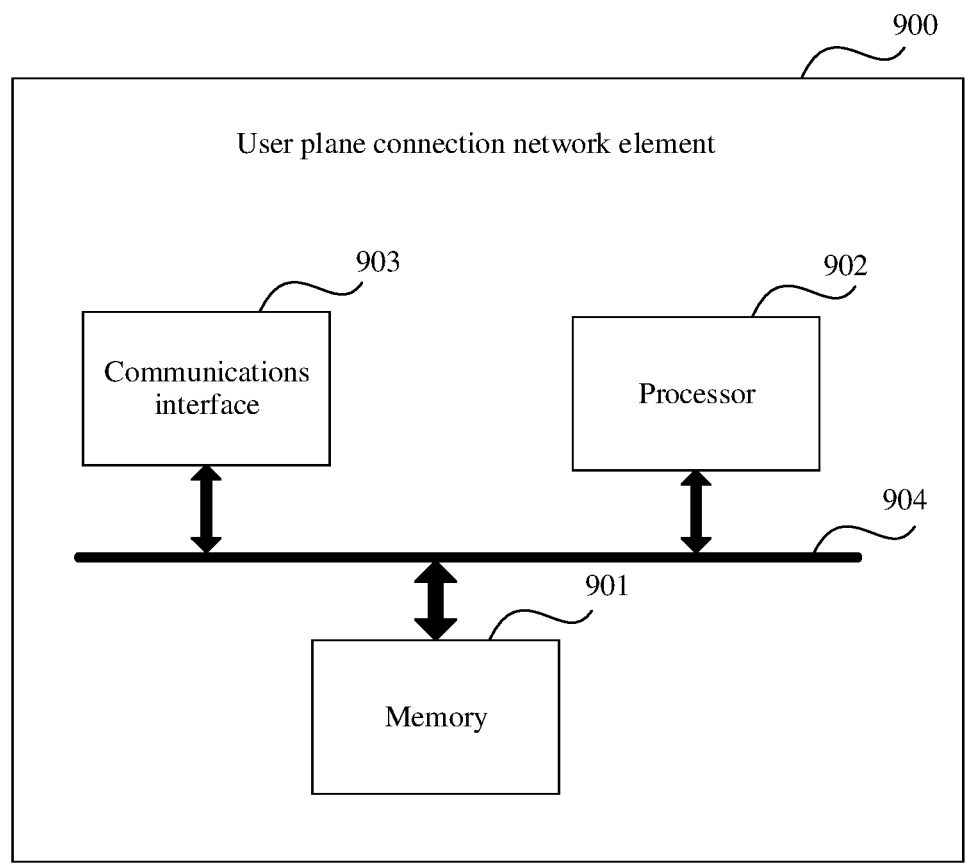
FIG. 9 is a schematic diagram of a UCF according to an exemplary embodiment.

When the processing unit 802 is a processor, the communications unit 803 is a communications interface, and the storage unit 801 is a memory, the apparatus 800 in this embodiment may be a UCF 900 shown in FIG. 9.

Referring to FIG. 9, a UCF 900 includes a processor 902 and a communications interface 903. Optionally, the UCF 900 may further include a memory 901. Optionally, the UCF 900 may further include a bus 904. The communications interface 903, the processor 902, and the memory 901 may be connected to each other by using the bus 904. The bus 904 may be a PCI bus, an EISA bus, or the like. The bus 904 may be classified as an address bus, a data bus, a control bus, and the like. For ease of representation, only one thick line is used to represent the bus in FIG. 9, but this does not mean that there is only one bus or only one type of bus.

Figure 10:
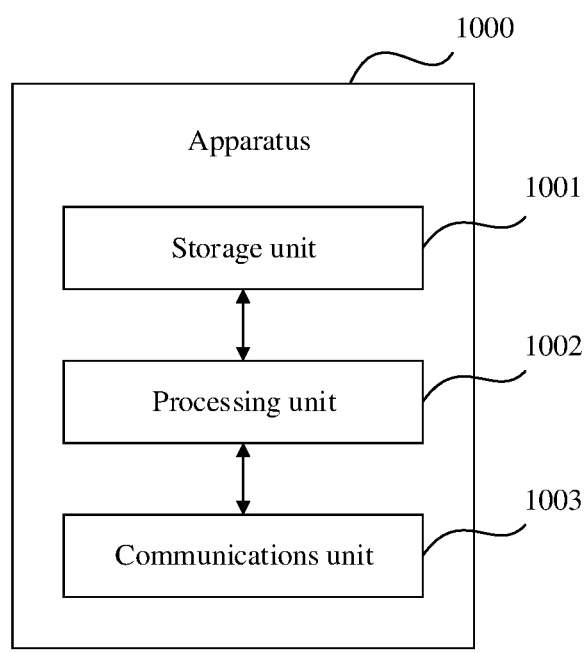
FIG. 10 is a schematic diagram of an apparatus according to an exemplary embodiment.

When an integrated unit is used, FIG. 10 is a possible exemplary block diagram of an apparatus according to an embodiment. An apparatus 1000 may exist in a form of software, may be an AUSF network element, or may be a chip in an AUSF network element. The apparatus 1000 includes a processing unit 1002 and a communications unit 1003. The communications unit 1003 may include a receiving unit and a sending unit. The processing unit 1002 is configured to control and manage an action of the apparatus 1000. The communications unit 1003 is configured to support the apparatus 1000 in communicating with another network entity (for example, a UCF, an AMF, or a UDM). The apparatus 1000 may further include a storage unit 1001, configured to store program code and data that are of the apparatus 1000.

The processing unit 1002 may be a processor or a controller, for example, may be a CPU, a general purpose processor, a DSP, an ASIC, an FPGA or another programmable logic device, a transistor logic device, a hardware component, or any combination thereof. The processor may implement or execute various exemplary logical blocks, modules, and circuits that are described with reference to content disclosed in an exemplary embodiment. The processor may be a combination of processors implementing a computing function, for example, including a combination of one or more microprocessors, or a combination of the DSP and a microprocessor. The communications unit 1003 may be a communications interface, a transceiver, a transceiver circuit, or the like. The communications interface is an umbrella term. In an exemplary implementation, the communications interface may include a plurality of interfaces, for example, may include an interface between the AUSF network element and the UCF, the AMF, or the UDM, and/or another interface. The storage unit 1001 may be a memory.

The processing unit 1002 may support the apparatus 1000 in performing an action of the AUSF network element in the foregoing method examples. For example, the processing unit 1002 may support the apparatus 1000 in performing step 303 in FIG. 3, step 408 in FIG. 4, step 506 in FIG. 5, and the like. The communications unit 1003 may support communication between the apparatus 1000 and the AMF, the UCF, or the UDM. For example, the communications unit 1003 may support the apparatus 1000 in performing step 303 in FIG. 3, steps 405, 406, 407, and 409 in FIG. 4, step 505 and step 506 in FIG. 5, and the like.

Figure 11:
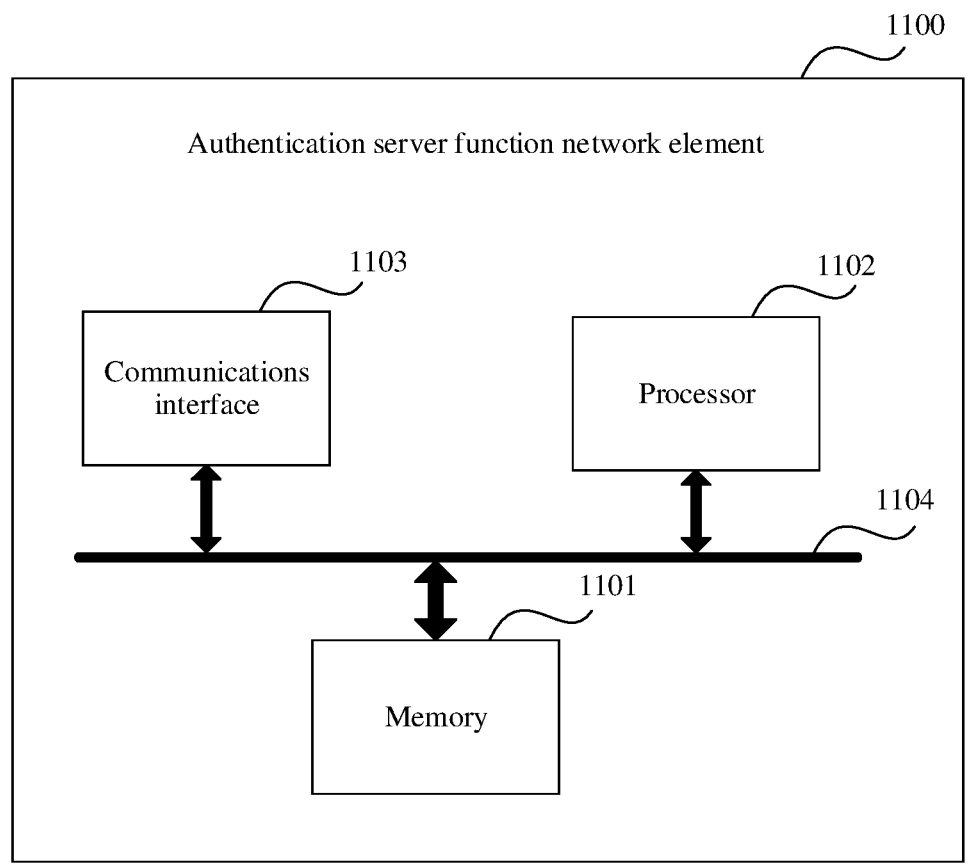
FIG. 11 is a schematic diagram of an authentication server function network element according to an exemplary embodiment.

When the processing unit 1002 is a processor, the communications unit 1003 is a communications interface, and the storage unit 1001 is a memory, the apparatus 1000 in this embodiment may be an AUSF network element 1100 shown in FIG. 11.

Referring to FIG. 11, an AUSF network element 1100 includes a processor 1102, a communications interface 1103, and a memory 1101. Optionally, the AUSF network element 1100 may further include a bus 1104. The communications interface 1103, the processor 1102, and the memory 1101 may be connected to each other by using the bus 1104. The bus 1104 may be a PCI bus, an EISA bus, or the like. The bus 1104 may be classified as an address bus, a data bus, a control bus, and the like. For ease of representation, only one thick line is used to represent the bus in FIG. 11, but this does not mean that there is only one bus or only one type of bus.

Figure 12:
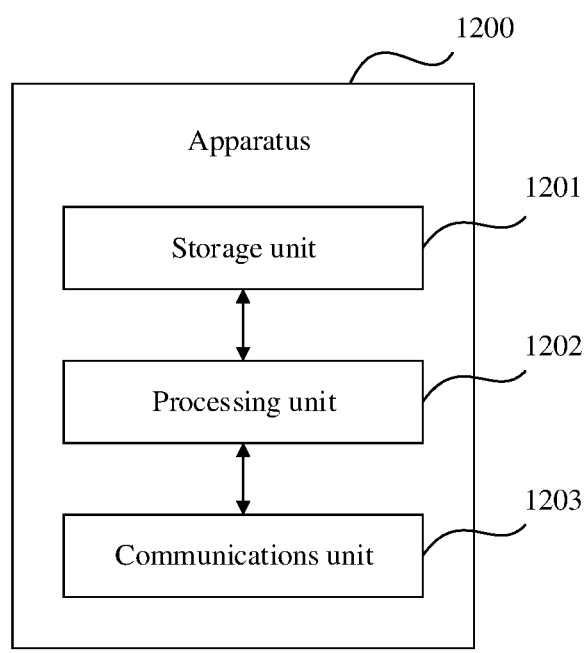
FIG. 12 is a schematic diagram of an apparatus according to an exemplary embodiment.

When an integrated unit is used, FIG. 12 is a possible exemplary block diagram of an apparatus according to an embodiment. An apparatus 1200 may exist in a form of software, or may be a terminal device, or may be a chip in a terminal device. The apparatus 1200 includes a processing unit 1202 and a communications unit 1203. In an implementation, the communications unit 1203 includes a receiving unit and a sending unit. The processing unit 1202 is configured to control and manage an action of the apparatus 1200. The communications unit 1203 is configured to support the apparatus 1200 in communicating with another network entity (for example, an AMF or a UCF). For example, the communications unit 1203 is configured to support the apparatus 1200 in processing the terminal device in the exemplary embodiments shown in FIG. 2a, FIG. 2b, and FIG. 3 to FIG. 7 and/or another process of the technical solutions described in an exemplary embodiment. The apparatus 1200 may further include a storage unit 1201, configured to store program code and data of the apparatus 1200.

The processing unit 1202 may be a processor or a controller, for example, may be a general-purpose CPU, a general-purpose processor, DSP, an (ASIC, an FPGA or another programmable logical device, a transistor logical device, a hardware component, or any combination thereof. The processor may implement or execute various example logical blocks, modules, and circuits that are described with reference to content disclosed in an exemplary embodiment. The processor may be a combination of processors implementing a computing function, for example, including a combination of one or more microprocessors, or a combination of the DSP and a microprocessor. The communications unit 1203 may be a communications interface, a transceiver, a transceiver circuit, or the like. The storage unit 1201 may be a memory.

Figure 13:
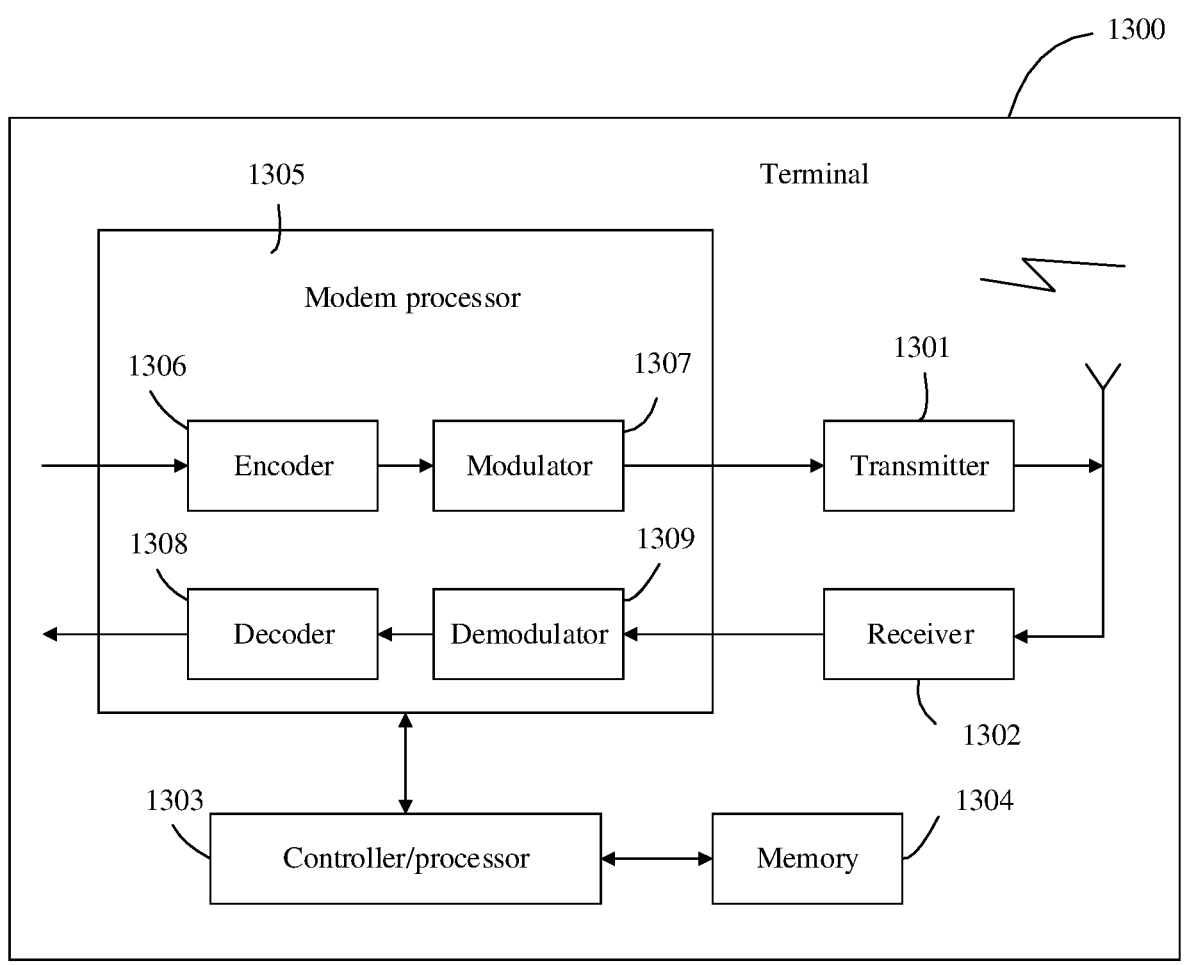
FIG. 13 is a schematic diagram of a terminal device according to an exemplary embodiment.

When the processing unit 1202 is a processor, the communications unit 1203 is a communications interface, and the storage unit 1201 is a memory, the apparatus 1200 in this embodiment may be a terminal device 1300 shown in FIG. 13.

FIG. 13 is a simplified schematic diagram of a possible design structure of a terminal device according to an embodiment. A terminal 1300 includes a transmitter 1301, a receiver 1302, and a processor 1303. The processor 1303 may also be a controller and is represented as a "controller/processor 1303" in FIG. 13. Optionally, the terminal 1300 may further include a modem processor 1305. The modem processor 1305 may include an encoder 1306, a modulator 1307, a decoder 1308, and a demodulator 1309.

In an example, the transmitter 1301 adjusts (for example, through analog conversion, filtering, amplification, and up-conversion) output sampling and generates an uplink signal, and the uplink signal is transmitted to the UCF in the foregoing embodiment by using an antenna. In a downlink, a downlink signal is received by using the antenna. The receiver 1302 adjusts (for example, through filtering, amplification, down-conversion, and digitization) on the signal received from the antenna, and provides an input sample. In the modem processor 1305, the encoder 1306 receives service data and a signaling message that are to be sent on an uplink, and processes (such as formats, encodes, and interleaves) the service data and the signaling message. The modulator 1307 further processes (such as through symbol mapping and modulation) encoded service data and an encoded signaling message, and provides an output sample. The demodulator 1309 processes (for example, demodulates) the input sample and provides symbol estimation. The decoder 1308 processes (for example, de-interleaves and decodes) the symbol estimation and provides the decoded data and signaling message that are to be sent to the terminal 1300. The encoder 1306, the modulator 1307, the demodulator 1309, and the decoder 1308 may be implemented as a combined modem processor 1305. These units perform processing based on a radio access technology (for example, an access technology of an LTE or another evolution system) used by a radio access network. It should be noted that when the terminal 1300 does not include the modem processor 1305, the foregoing functions of the modem processor 1305 may also be implemented by the processor 1303.

The processor 1303 controls and manages an action of the terminal 1300, and is configured to perform a processing process performed by the terminal 1300 in the foregoing embodiments. For example, the terminal device 1303 is further configured to perform a processing process of the terminal device in the exemplary embodiments shown in FIG. 2a, FIG. 2b, FIG. 3, FIG. 4, FIG. 5, or FIG. 7 and/or another process of the technical solutions described in an exemplary embodiment.

Further, the terminal device 1300 may further include a memory 1304. The memory 1304 is configured to store program code and data that are of the terminal device 1300.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave)) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments may implement or operate the described functions by using a general processor, a DSP, an ASIC, an FPGA or another programmable logical apparatus, a discrete gate or transistor logic, a discrete hardware component, or a design of any combination thereof. The general processor may be a microprocessor. Optionally, the general processor may also be any traditional processor, controller, microcontroller, or state machine. The processor may also be implemented by using a combination of computing apparatuses, such as a digital signal processor and a microprocessor, a plurality of microprocessors, one or more microprocessors with a digital signal processor core, or any other similar configuration.

Steps of the exemplary embodiments or algorithms described in the embodiments may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may alternatively be integrated into a processor. The processor and the storage medium may be disposed in an ASIC, and the ASIC may be disposed in the terminal device. Optionally, the processor and the storage medium may alternatively be disposed in different components of the terminal device.

These computer program instructions may alternatively be loaded onto a computer or another programmable data processing device, so that a series of operations and steps are performed on the computer or the other programmable device, thereby generating computer-implemented processing. Therefore, the instructions executed on the computer or the other programmable device provide steps for implementing an exemplary function in one or more processes in the flowcharts and/or in one or more blocks in the block diagrams.

Although an exemplary embodiment is described with reference to exemplary features and the embodiments thereof, it is clear that various modifications and combinations may be made to an exemplary embodiment without departing from the spirit and scope of the embodiments. Correspondingly, the specification and accompanying drawings are merely exemplary descriptions defined by the accompanying claims, and are considered to already cover any of or all modifications, variations, combinations or equivalents within the scope of the embodiments. It is clear that a person skilled in the art can make various modifications and variations to an exemplary embodiment without departing from the spirit and scope of the embodiments. In this way, an exemplary embodiment is intended to cover these modifications and variations provided that these modifications and variations fall within the scope of protection defined by the following claims and their equivalent technologies.

What is claimed is:

1. A communication method, comprising:
receiving, by a user plane connection (UCF) network element, a first message from a terminal device, wherein the first message comprises an identifier of the terminal device and first information other than the identifier of the terminal device, and the first information is information that needs to be sent by the terminal device to a network function (NF);
learning, by the UCF, of a first service type based on the first message, wherein learning of a first service type comprises obtaining at least one of an identifier of a network service or an identifier of an application layer protocol;
learning, by the UCF based on the first service type and the identifier of the terminal device, of a first NF that serves the terminal device; and
sending, by the UCF, the first information as provided in the first message to the first NF.

2. The method according to claim 1, wherein the learning, by the UCF, of a first service type based on the first message further comprises:
determining, by the UCF, the first service type based on first service type information, wherein the first message carries the first service type information; or
learning, by the UCF, of the first service type based on a first port number corresponding to a port over which the first message is received and a correspondence between a port number and a service type.

3. The method according to claim 1, wherein the learning, by the UCF based on the first service type and the identifier of the terminal device, of a first NF that serves the terminal device further comprises:
querying, by the UCF, local information based on the first service type and the identifier of the terminal device, to determine the first NF, wherein the local information comprises a correspondence between a service type and a network function; or
querying, by the UCF, the first NF from a unified data management (UDM) network element based on the first service type and the identifier of the terminal device.

4. The method according to claim 1, further comprising:
receiving, by the UCF, a second message sent by the terminal device, wherein the second message is used to request to establish a connection, and the second message comprises the identifier of the terminal device; and
establishing, by the UCF, a connection to the terminal device, and saving a context of the terminal device.

5. The method according to claim 4, further comprising:
sending, by the UCF, a third message to the UDM, wherein the third message comprises the identifier of the terminal device, information about the UCF, and an NF type of the UCF.

6. The method according to claim 4, wherein the second message further comprises the first service type, and the method further comprises: allocating, by the UCF, the corresponding first port number to the first service type, storing a correspondence between the first service type and the first port number, and notifying the terminal device of the correspondence.

7. The method according to claim 4, wherein the second message further comprises first security information, and the method further comprises:
obtaining, by the UCF, a security key from an authentication server function (AUSF) network element based on the identifier of the terminal device;
performing verification based on the security key and the first security information; and
when the verification succeeds, performing the step of establishing a connection to the terminal device.

8. The method according to claim 1, further comprising:
receiving, by the first NF, the first information from the UCF.

9. A device configured to operate a network element, comprising:
a memory storage comprising instructions; and
one or more processors in communication with the memory, wherein the one or more processors execute the instructions to:
receive a first message from a terminal device, wherein the first message comprises an identifier of the terminal device and first information other than the identifier of the terminal device, and the first information is information that needs to be sent by the terminal device to a network function (NF);
learn of a first service type based on the first message, said first service type comprising at least one of an identifier of a network service or an identifier of an application layer protocol;
learn based on the first service type and the identifier of the terminal device, of a first NF that serves the terminal device; and
send the first information as provided in the first message to the first NF.

10. The device according to claim 9, wherein in learning of a first service type based on the first message, the one or more processors execute the instructions to:
determine the first service type based on first service type information, wherein the first message carries the first service type information; or
learn of the first service type based on a first port number corresponding to a port over which the first message is received and a correspondence between a port number and a service type.

11. The device according to claim 9, wherein in learning based on the first service type and the identifier of the terminal device, of a first NF that serves the terminal device, the one or more processors execute the instructions to:
query local information based on the first service type and the identifier of the terminal device, to determine the first NF, wherein the local information comprises a correspondence between a service type and a network function; or
query the first NF from a unified data management (UDM) network element based on the first service type and the identifier of the terminal device.

12. The device according to claim 9, wherein the one or more processors execute the instructions to:
receive a second message sent by the terminal device, wherein the second message is used to request to establish a connection, and the second message comprises the identifier of the terminal device; and
establish a connection to the terminal device, and saving a context of the terminal.

13. The device according to claim 12, wherein the one or more processors execute the instructions to:
send a third message to the UDM, wherein the third message comprises the identifier of the terminal device, information about a user plane connection (UCF) network element, and an NF type of the UCF.

14. The device according to claim 12, wherein the second message further comprises the first service type, and wherein the one or more processors execute the instructions to: allocate the corresponding first port number to the first service type, store a correspondence between the first service type and the first port number, and notify the terminal device of the correspondence.

15. The device according to claim 12, wherein the second message further comprises first security information, and the one or more processors execute the instructions to:
  obtain a security key from an authentication server function (AUSF) network element based on the identifier of the terminal device;
  perform verification based on the security key and the first security information; and
  when the verification succeeds, perform the step of establishing a connection to the terminal device.

16. A terminal device, comprising:
  a memory storage comprising instructions; and
  one or more processors in communication with the memory, wherein the one or more processors execute the instructions to:
  obtain a user plane connection security context from an authentication server function (AUSF) network element, and registering the terminal device to a network;
  after registering the terminal device to the network, send a discovery message to a network function repository function (NRF), and receiving, from the NRF, information about a user plane connection (UCF) network element;
  establish a connection to the UCF;
  send a first message to the UCF, wherein the first message comprises an identifier of the terminal device and first information other than the identifier of the terminal device, and the first information is information that needs to be sent by the terminal device to a first network function; and
  receive second information that is sent by the UCF and that is sent by the first network function to the terminal device.

17. The terminal device according to claim 16,
  wherein the user plane connection security context comprises a security parameter required for establishing a connection between the terminal device and the UCF; and
  wherein the one or more processors execute the instructions to:
  generate first security information based on the user plane connection security context, wherein
  the first message further carries the first security information that is used to perform security verification.

18. The terminal device according to claim 16, wherein the one or more processors execute the instructions to:
  send the discovery message directly from the terminal device to the NRF, wherein the message carries a network function (NF) type of the UCF.

* * * * *